(12) United States Patent
Wilson

(10) Patent No.: US 8,854,226 B2
(45) Date of Patent: Oct. 7, 2014

(54) SYSTEM AND PROCESS FOR MONITORING AND SCHEDULING MAINTENANCE ON MECHANICAL EQUIPMENT

(75) Inventor: David C. Wilson, Minneapolis, MN (US)

(73) Assignee: Trane International Inc., Piscataway, NJ (US)

( * ) Notice: Subject to any disclaimer, the term of this patent is extended or adjusted under 35 U.S.C. 154(b) by 636 days.

(21) Appl. No.: 12/792,405

(22) Filed: Jun. 2, 2010

(65) Prior Publication Data

US 2011/0298629 A1    Dec. 8, 2011

(51) Int. Cl.
G08B 7/00        (2006.01)
G05B 19/00       (2006.01)
G08B 1/08        (2006.01)
F25B 49/00       (2006.01)
F04D 27/02       (2006.01)
G05B 23/02       (2006.01)

(52) U.S. Cl.
CPC ................................. G05B 23/0283 (2013.01)
USPC ............ 340/679; 340/5.1; 340/683; 340/506; 340/539.24; 62/126; 348/148; 415/1; 415/121.3

(58) Field of Classification Search
USPC ....................... 340/679, 5.1, 683, 506, 539.24
See application file for complete search history.

(56) References Cited

U.S. PATENT DOCUMENTS

| | | | |
|---|---|---|---|
| 5,481,884 A | 1/1996 | Scoccia | |
| 6,343,251 B1 | 1/2002 | Herron et al. | |
| 6,366,211 B1 | 4/2002 | Parker | |
| 6,792,325 B2 | 9/2004 | Arima et al. | |
| 6,862,485 B2 | 3/2005 | Arima et al. | |
| 6,955,302 B2 | 10/2005 | Erdman, Jr. | |
| 7,200,524 B2 | 4/2007 | Kang et al. | |
| 7,225,054 B2 | 5/2007 | Amundson et al. | |
| 7,295,896 B2 | 11/2007 | Norbeck | |
| 7,375,304 B2 * | 5/2008 | Kainec et al. | 219/130.01 |
| 7,424,345 B2 | 9/2008 | Norbeck | |
| 7,646,308 B2 * | 1/2010 | Paoletti et al. | 340/635 |
| 7,939,956 B1 * | 5/2011 | Larsen | 290/44 |
| 8,290,721 B2 * | 10/2012 | Wehrs et al. | 702/45 |
| 2004/0143474 A1 | 7/2004 | Haeberle et al. | |
| 2004/0143510 A1 | 7/2004 | Haeberle et al. | |
| 2004/0215422 A1 | 10/2004 | Dodge et al. | |

(Continued)

OTHER PUBLICATIONS

Trane Company, Tracer Summit Building Automation System Brochure, Sep. 2001, 20 pages.

(Continued)

*Primary Examiner* — Fekadeselassie Girma
(74) *Attorney, Agent, or Firm* — Hamre, Schumann, Mueller & Larson, P.C.

(57) ABSTRACT

A method of scheduling maintenance on mechanical equipment includes monitoring the mechanical equipment with a sensor and collecting diagnostic information provided by the sensor with a local controller associated with the mechanical equipment. The diagnostic information relates to an operational characteristic of the mechanical equipment. The method also includes generating an alarm with the local controller in response to the collected diagnostic information, transferring the alarm from the local controller to a remote monitoring system, assigning an alarm value to the alarm using one of the local controller and the remote monitoring system, referencing a maintenance schedule for the mechanical equipment to ascertain a scheduled maintenance timeframe, and one of generating a work order and not generating the work order for the mechanical equipment based on the alarm value and the scheduled maintenance timeframe.

1 Claim, 2 Drawing Sheets

(56) References Cited

U.S. PATENT DOCUMENTS

| | | |
|---|---|---|
| 2005/0151660 A1 | 7/2005 | Mou |
| 2006/0100797 A1* | 5/2006 | Poorman et al. ............... 702/56 |
| 2009/0171596 A1* | 7/2009 | Houston ....................... 702/45 |
| 2010/0127880 A1 | 5/2010 | Schechter et al. |
| 2010/0300628 A1* | 12/2010 | Cole et al. ....................... 160/10 |
| 2011/0052368 A1* | 3/2011 | Zhou et al. ....................... 415/1 |
| 2011/0298629 A1* | 12/2011 | Wilson ......................... 340/679 |

OTHER PUBLICATIONS

International Search Report and Written Opinion for corresponding International Application No. PCT/US11/37836 mailed on Dec. 13, 2011.

* cited by examiner

SYSTEM AND PROCESS FOR MONITORING AND SCHEDULING MAINTENANCE ON MECHANICAL EQUIPMENT

FIELD OF THE INVENTION

The present invention relates to mechanical equipment, and more particularly to maintenance of mechanical equipment.

BACKGROUND OF THE INVENTION

Microcontrollers on mechanical equipment typically generate more diagnostic information than can be efficiently managed by people. Microcontrollers also typically generate alarms that are triggered in response to particular values associated with an operational characteristic of the mechanical equipment deviating from an acceptable range of values. Alarms not coinciding with catastrophic failure of the mechanical equipment are often ignored by the operators of the equipment if they do not present an urgent problem that interferes with normal business operations. Alarms of this nature are also often unaddressed by technicians because of a backlog of urgent problems that need to be addressed to continue or reestablish normal business operations.

SUMMARY OF THE INVENTION

The present invention provides, in one aspect, a method of scheduling maintenance on mechanical equipment. The method includes monitoring the mechanical equipment with a sensor and collecting diagnostic information provided by the sensor with a local controller associated with the mechanical equipment. The diagnostic information relates to an operational characteristic of the mechanical equipment. The method also includes generating an alarm with the local controller in response to the collected diagnostic information, transferring the alarm from the local controller to a remote monitoring system, assigning an alarm value to the alarm using one of the local controller and the remote monitoring system, referencing a maintenance schedule for the mechanical equipment to ascertain a scheduled maintenance timeframe, and one of generating a work order and not generating the work order for the mechanical equipment based on the alarm value and the scheduled maintenance timeframe.

The present invention provides, in another aspect, a system for scheduling maintenance on mechanical equipment. The system includes at least one sensor monitoring the mechanical equipment and outputting diagnostic information relating to an operational characteristic of the mechanical equipment, a local controller in communication with the sensor for collecting the diagnostic information and generating an alarm in response to the collected diagnostic information, and a remote monitoring system in communication with the local controller for receiving the alarm. The remote monitoring system is configured to assign an alarm value to the alarm and reference a maintenance schedule for the mechanical equipment to ascertain a scheduled maintenance timeframe. The remote monitoring system is also configured to either generate a work order or not generate the work order for the mechanical equipment based on the alarm value and the scheduled maintenance timeframe.

The present invention provides, in yet another aspect, a method of scheduling maintenance on mechanical equipment. The method includes monitoring the mechanical equipment with a sensor, and collecting diagnostic information provided by the sensor with a local controller associated with the mechanical equipment. The diagnostic information relates to an operational characteristic of the mechanical equipment. The method also includes generating an alarm with the local controller in response to the collected diagnostic information, transferring the alarm from the local controller to a remote monitoring system, assigning an alarm value to the alarm using one of the local controller and the remote monitoring system, referencing a maintenance schedule for the mechanical equipment to ascertain a scheduled maintenance timeframe, generating a work order for the mechanical equipment when the alarm value is outside a predetermined range of alarm values for the mechanical equipment, and not generating the work order for the mechanical equipment when the alarm value is inside the predetermined range of alarm values for the mechanical equipment.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
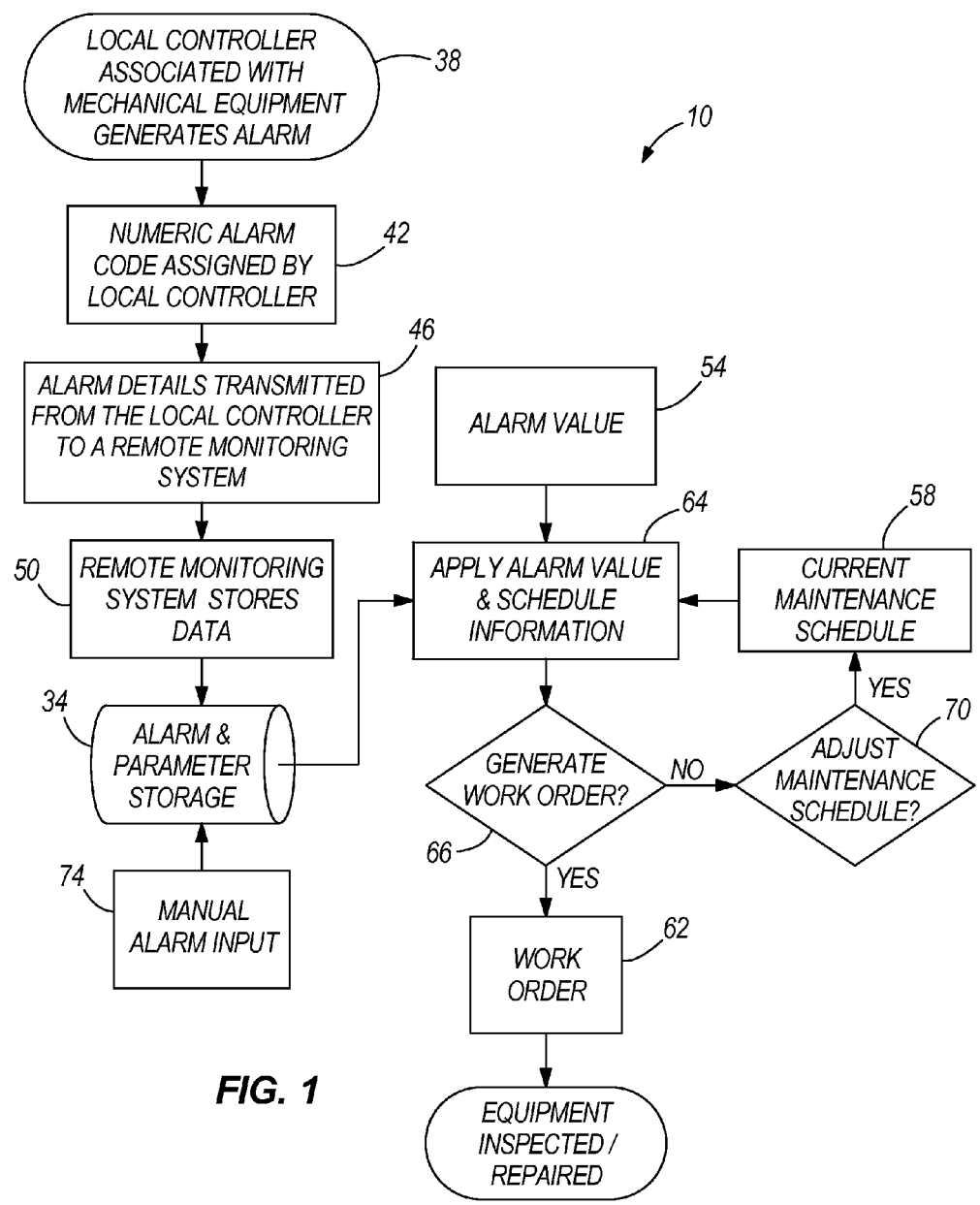
FIG. 1 is a flow chart illustrating a method of scheduling maintenance on mechanical equipment.
Figure 2:
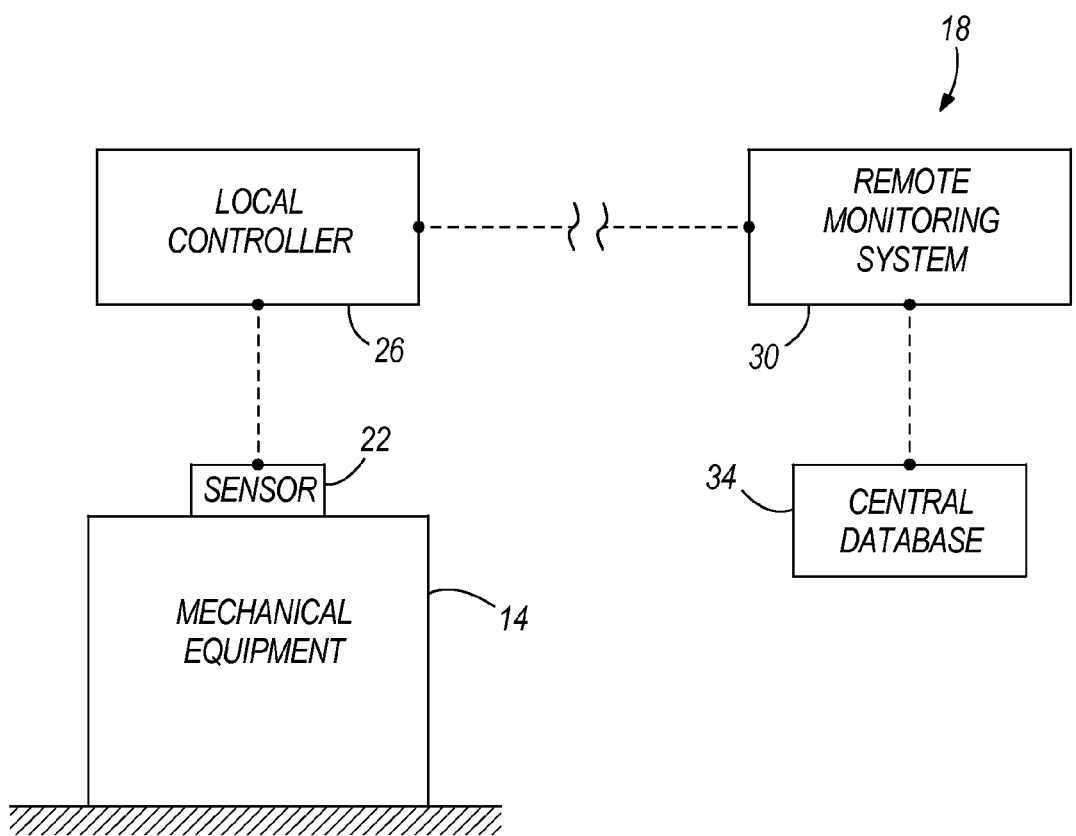
FIG. 2 is a schematic illustrating a system for scheduling maintenance on mechanical equipment.

FIG. 1 illustrates a flow chart of a process 10 for monitoring and scheduling maintenance on mechanical equipment 14, which is schematically shown in FIG. 2. Such mechanical equipment 14 may include any of a number of different mechanical devices (e.g., engines, motors, pumps, blowers, fans, etc.), or subassemblies thereof, for performing any of a number of different functions within a larger system 18. For example, the mechanical equipment 14 may be configured as one of the components of a building heating ventilation and air-conditioning ("HVAC") system (e.g., a chiller, a compressor, fans, a cooling tower, air handlers, heat exchangers, etc.).

With continued reference to FIG. 2, the system 18 includes at least one sensor 22 for monitoring the mechanical equipment 14 and outputting diagnostic information relating to an operational characteristic of the mechanical equipment 14. As used herein, "diagnostic information" includes information or data that may be used to diagnose a problem with the mechanical equipment 14. For example, the sensor 22 may be configured as a pressure transducer positioned in the discharge outlet of a centrifugal blower. As another example, the sensor 22 may be configured as a tachometer for measuring the rotational speed of a shaft. The sensor 22 may have any of a number of different configurations for measuring or detecting other operational characteristics of the mechanical equipment 14. Although only a single sensor 22 is shown in FIG. 2, it should be understood that a plurality of sensors 22 may be associated with the mechanical equipment 14.

The system 18 also includes a local controller 26 associated with the mechanical equipment 14 and in communication with the sensor 22 for collecting and analyzing the diagnostic information output by the sensor 22. In addition to controlling the operation of the particular mechanical equipment 14 with which it is associated, the local controller 26 may also be programmed to recognize when a problem has occurred with the mechanical equipment 14. Particularly, the controller 26 may be programmed to generate an alarm when the collected diagnostic information indicates or suggests that the mechanical equipment 14 is operating outside of a predetermined acceptable range, or that some operational or non-operational characteristic of the mechanical equipment 14 is outside of a predetermined acceptable range of values particular to that characteristic. The local controller 26 may be a component of a building automation system, such as the TRACER SUMMIT building automation system available from The Trane Company of La Crosse, Wis. The local controller 26 may communicate with the sensor 22 wirelessly or using wires interconnecting the local controller 26 and the sensor 22.

With continued reference to FIG. 2, the system 18 includes a central or a remote monitoring system 30 in communication with the local controller 26 for receiving and storing the alarm in a central database 34. All of the alarms generated by the local controller 26 are transferred to the remote monitoring system 30, and subsequently saved in the central database 34, without being filtered. The remote monitoring system 30 may also receive supplemental information from the local controller 26 associated with the alarm. For example, such supplemental information may include the operating organization, external ambient conditions at the time of the alarm, and related internal operating parameter measurements (i.e., the raw diagnostic information) before and after the alarm. The local controller 26 may communicate with the remote monitoring system 30 wirelessly or using wires interconnecting the local controller 26 and the remote monitoring system 30.

With reference to the flowchart of FIG. 1, the process 10 is initiated at box 38 when the local controller 26 generates an alarm in response to a detected deviation or anomaly within the collected diagnostic information that would suggest that the mechanical equipment 14 has malfunctioned or is operating outside of its intended or acceptable parameters. The local controller 26 may also generate an alarm after a comparison of the mechanical equipment's efficiency metrics to the design parameters of the equipment 14, or comparable equipment in operation in similar conditions. The process 10 continues at box 42 where the local controller 26 assigns a numeric code to the alarm that is representative of one or more fault conditions that could have potentially caused the alarm. The local controller 26 then transmits the alarm, and any supplemental information associated with the alarm, to the remote monitoring system 30 (see box 46). As discussed above, the local controller 26 may be hard-wired to the remote monitoring system 30 to transmit the alarm over a system of wires or cables, or the local controller 26 may transmit the alarm wirelessly to the remote monitoring system 30 (e.g., using a radio or other frequency transmission). Alternatively, the local controller 26 may transmit the alarm through telephone lines (e.g., using a modem), through a computer network (e.g., the Internet or a local computer network), or through a wireless cellular data network. The process 10 continues at box 50, where the remote monitoring system 30 stores the alarm and any supplemental information associated with the alarm in the central database 34.

With continued reference to FIG. 1, the remote monitoring system 30 assigns a value to each alarm received from the local controller 26 commensurate with the severity of the alarm (see box 54), and based on the numeric code assigned by the local controller 26. For example, the remote monitoring system 30 may assign a higher alarm value associated with a critical component in the mechanical equipment 14, or an alarm associated with mechanical equipment 14 essential to the continued operation of the system 18 in which the mechanical equipment 14 is used. Likewise, the remote monitoring system 30 may assign a lower alarm value if it is associated with an ancillary component in the mechanical equipment 14, or if the alarm is associated with mechanical equipment 14 that is non-essential to the continued operation of the system 18 in which the mechanical equipment 14 is used. Alternatively, the values assigned to the alarms may be reversed, such that the values assigned to the alarms are inversely proportional to the severity of the alarm. As a further alternative, the local controller 26 may be programmed to assign the alarm values, rather than the remote monitoring system 30.

In some embodiments of the invention, the alarm value may include a base value, which is predetermined and associated with the numeric code assigned by the local controller 26, and a scalar multiplier, which may be based on any of a number of different factors. Consequently, the alarm value would be equal to the product of the base value and the scalar multiplier. Generally, the scalar multiplier may be used to customize the process 10 depending on the needs or requirements of each customer. For example, the scalar multiplier may be based on the importance of the mechanical equipment 14 associated with the alarm. Alternatively, the scalar multiplier may be based on the maintenance history of the mechanical equipment 14 (i.e., the scalar multiplier may be increased for mechanical equipment 14 having been serviced several times in recent history). The scalar multiplier may also be adjusted at any time during operation of the system 18. For example, after initial implementation of the system 18 in which the mechanical equipment 14 is used, the scalar multiplier may be set to one. Thereafter, the scalar multiplier may be increased or decreased manually, or as part of an automatic continuous process, to improve or optimize the maintenance attention given to the particular mechanical equipment 14. The base values and/or the scalar multiplier may be programmed into the remote monitoring system 30 or saved in a remote database.

Alternatively, the remote monitoring system 30 may adjust the predetermined base values as a part of an automatic continuous process to improve or optimize the maintenance attention given to the particular mechanical equipment 14. The base values may be periodically adjusted based on the diagnostic information collected by one of the local controller 26 and the remote monitoring system 30, or the maintenance history of the mechanical equipment 14. As a further alternative, the remote monitoring system 30 may be manually reprogrammed to change the base values, or the base values may be changed in the remote database if saved there.

In some embodiments of the invention, the alarm value may be the product of the base value, a first scalar multiplier, and a second scalar multiplier to further improve or optimize the maintenance attention given to the mechanical equipment 14. For example, the first scalar multiplier may be manually input by the customer (e.g., the importance of the mechanical equipment 14 to the customer's process), and the second scalar multiplier may be automatically adjusted by a continuous process implemented by the remote monitoring system 30 to improve or optimize the maintenance attention given to the mechanical equipment 14 (e.g., the maintenance history of the mechanical equipment 14). Additional scalar multipliers may be used if needed.

With continued reference to FIG. 1, the remote monitoring system 30 references a current maintenance schedule 58 for the mechanical equipment 14, for each alarm associated with the particular mechanical equipment 14, to ascertain a scheduled maintenance timeframe for that mechanical equipment 14. The maintenance timeframe may fall into one of several time categories with reference to the date on which maintenance is scheduled to next occur (e.g., within 30, 60, or 90 days). Alternatively, the maintenance timeframe may fall into one of several time categories with reference to the date on which maintenance on the mechanical equipment 14 last occurred (e.g., within the last 15 or 30 days, etc.).

For each alarm, the remote monitoring system 30 analyzes the alarm value and the scheduled maintenance timeframe (see box 64) to determine whether or not a work order 62 should be generated to prompt a technician to troubleshoot the mechanical equipment 14 (see box 66). For example, if the alarm value is outside a predetermined range of acceptable alarm values for the mechanical equipment 14, the remote monitoring system 30 will automatically generate the work order 62. In some embodiments of the invention, an alarm value that exceeds some predetermined maximum acceptable value will automatically generate the work order 62. Likewise, when the alarm value is inside the predetermined range of alarm values for the mechanical equipment 14 (i.e., when the alarm value is below some predetermined maximum acceptable value), the work order 62 is not generated. Most of the alarms will not generate a work order 62.

The predetermined range of acceptable alarm values, or the maximum acceptable alarm value, may be variable dependent upon the particular maintenance time category in which the alarm has occurred. For example, the predetermined range of acceptable alarm values or the maximum acceptable alarm value may be decreased or adjusted downwardly if maintenance on the mechanical equipment 14 has recently occurred, or if maintenance is scheduled to occur in the near future. Likewise, the predetermined range of acceptable alarm values or the maximum acceptable alarm value may be increased or adjusted upwardly if maintenance on the mechanical equipment 14 is not scheduled to occur for a long period of time (e.g., 90 days).

The remote monitoring system 30 may also automatically generate the work order 62 if maintenance on the mechanical equipment 14 is scheduled to occur in the near future (e.g., within the next 15 or 30 days). In some embodiments of the invention, the remote monitoring system 30 accesses the current maintenance schedule 58 on a daily basis for the mechanical equipment 14, without first being prompted by an alarm associated with the mechanical equipment 14, to determine whether a work order 62 should be generated to prompt a technician to perform routine maintenance on the mechanical equipment 14. Such routine or preventative maintenance may be scheduled to occur periodically (e.g., quarterly). However, the process 10 generally attempts to delay regularly scheduled maintenance on mechanical equipment 14 operating within acceptable parameters, and expedite the maintenance on mechanical equipment 14 operating outside acceptable parameters.

With continued reference to FIG. 1, an operator of the mechanical equipment 14 may manually prompt the remote monitoring system 30 to generate a work order 62 by inputting a request or complaint to the central database 34 (see box 74).

If the remote monitoring system 30 does not generate the work order 62 in response to the alarm, the remote monitoring system 30 considers whether the current maintenance schedule 58 should be adjusted to increase or decrease the timeframe or time category within which the next routine maintenance is scheduled to occur on the mechanical equipment 14 (see box 70). In some embodiments of the invention, the maintenance on the mechanical equipment 14 may be rescheduled to occur prior to the next-scheduled maintenance timeframe when the alarm value is inside the predetermined range of acceptable alarm values for the mechanical equipment 14 (or, below the maximum acceptable alarm value). For example, if the alarm value is not high enough for the remote monitoring system 30 to automatically generate the work order 62, but sufficiently high enough within the range of acceptable alarm values for the particular mechanical equipment 14 (i.e., proximate an upper limit of the range of acceptable alarm values), the remote monitoring system 30 may reschedule routine maintenance on the mechanical equipment 14 from a time category of 90-120 days to within 30 days. Likewise, if the alarm value is relatively low within the range of acceptable alarm values for the mechanical equipment 14, the remote monitoring system 30 would leave the current maintenance schedule 58 unchanged. Alternatively, if the alarm value is very low within the range of acceptable alarm values for the mechanical equipment 14 (i.e., proximate a lower limit of the range of acceptable alarm values), the remote monitoring system 30 may reschedule the routine maintenance on the mechanical equipment 14 to occur later than the next-scheduled maintenance timeframe. Most of the alarms, however, will not result in any change to the current maintenance schedule 58.

Once generated, the work orders 62 are routed to a pool of technicians to troubleshoot the mechanical equipment 14. In some embodiments of the invention, the remote monitoring system 30 may assign a priority level to the work order 62 based on the alarm value. The technicians may then address the work orders 62 in order of ranking, highest priority to lowest priority. The remote monitoring system 30 may also be programmed to generate a minimum number of work orders 62 in a particular time period to ensure that the available technicians are being continuously utilized.

The work orders 62 may be routed to technicians having experience commensurate with the priority level of the work order 62. For example, more experienced technicians may be dispatched to handle relatively high-priority work orders 62. Likewise, less experienced technicians may be dispatched to handle relative low-priority work orders 62. Alternatively, the work orders 62 may be routed based upon other factors (e.g., geographic coverage, equipment type, etc.). The work orders 62 may include a chronological record of all recorded alarms since the previous maintenance on the mechanical equipment 14 to assist the technician in troubleshooting the mechanical equipment 14.

When implementing the process 10 shown in FIG. 1, ideally, the amount and frequency of work orders 62 that are generated closely follows the work order activity prior to implementation of the process 10. In other words, alarms that require immediate action are assigned the highest alarm values and the alarms that are typically ignored are assigned the lowest alarm values. After a period of time after implementation of the process 10 (e.g., two months), the base values (and the scalar multipliers, if any exist) for each type of alarm may be revised. An alarm value may be increased if it is a reasonable predictor of an alarm that progressed through the process 10, or if it is associated with a repair identified during preventative maintenance of the mechanical equipment 14. This periodic analysis of the alarm values and/or scalar multipliers may be repeated on a regular basis to tune the base values and/or scalar multipliers to the particular system 18 in which the mechanical equipment 14 is used.

The process 10 shown in FIG. 1, when automated, can reduce the cost of ownership of the mechanical equipment 14 over time by improving the efficiency of the equipment 14 or by making repairs to the equipment 14 before a catastrophic failure occurs. The process 10 may also reduce the costs associated with maintenance of the mechanical equipment 14 by matching the appropriate technician skill level with the severity of the alarm. This ensures that more costly, higher-level technicians are not utilized to perform routine repairs that could otherwise be performed by a lower-level technician.

Various features of the invention are set forth in the following claims.

What is claimed is:

1. A method of scheduling maintenance on mechanical equipment, the method comprising:

monitoring the mechanical equipment with a sensor;

collecting diagnostic information provided by the sensor with a local controller associated with the mechanical equipment, the diagnostic information relating to an operational characteristic of the mechanical equipment:

generating an alarm with the local controller in response to the collected diagnostic information;

transferring the alarm from the local controller to a remote monitoring system;

assigning an alarm value to the alarm using one of the local controller and the remote monitoring system;

referencing a maintenance schedule for the mechanical equipment to ascertain a scheduled maintenance timeframe; and one of generating a work order and not generating the work order for the mechanical equipment based on the alarm value and the scheduled maintenance timeframe, wherein the alarm value comprises a base value and a first scalar multiplier, and wherein assigning the alarm value includes assigning a product of the base value, the first scalar multiplier and a second scalar multiplier.

* * * * *